(12) United States Patent
Kurth et al.

(10) Patent No.: US 9,121,505 B2
(45) Date of Patent: Sep. 1, 2015

(54) SEAL ASSEMBLY

(75) Inventors: Jürgen Kurth, Odenthal (DE); Jochen Lorenscheit, Rimpar (DE)

(73) Assignee: AKTIEBOLAGET SKF, Gothenburg (SE)

( * ) Notice: Subject to any disclaimer, the term of this patent is extended or adjusted under 35 U.S.C. 154(b) by 757 days.

(21) Appl. No.: 13/256,446

(22) PCT Filed: Mar. 12, 2010

(86) PCT No.: PCT/EP2010/001580
§ 371 (c)(1),
(2), (4) Date: Sep. 14, 2011

(87) PCT Pub. No.: WO2010/105782
PCT Pub. Date: Sep. 23, 2010

(65) Prior Publication Data
US 2012/0001395 A1    Jan. 5, 2012

(30) Foreign Application Priority Data
Mar. 19, 2009 (DE) .......................... 10 2009 013 969

(51) Int. Cl.
*F16J 15/32* (2006.01)
*F16J 15/453* (2006.01)
(Continued)

(52) U.S. Cl.
CPC ............ *F16J 15/3284* (2013.01); *F16J 15/453* (2013.01); *F16J 15/0806* (2013.01); *F16J 15/102* (2013.01); *F16J 15/20* (2013.01); *F16J 15/3496* (2013.01)

(58) Field of Classification Search
CPC ....... F16J 15/3284; F16J 15/102; F16J 15/20; F16J 15/0806; F16J 15/3496; F16J 15/453
USPC ................................................... 277/456, 569
See application file for complete search history.

(56) References Cited

U.S. PATENT DOCUMENTS 4,384,725 A * 5/1983 Nenov ........................ 277/431
4,460,184 A * 7/1984 Colanzi et al. ............... 277/349
(Continued)

FOREIGN PATENT DOCUMENTS

| JP | 7048560 A | 2/1995 |
| WO | WO2007126432 A | 11/2007 |
| WO | WO2009089318 A | 7/2009 |

OTHER PUBLICATIONS

Zimmermann, J H. "Silicone nanofilaments as functional coatings : properties, applications and modifications", 2008, University of Zurich, Facultu of Science. Posted at Zurich Open Repository and Archive <http://dx.doi.org/10.5167/uzh-16498>.*

(Continued)

*Primary Examiner* — Kristina Fulton
*Assistant Examiner* — Nicholas L Foster
(74) *Attorney, Agent, or Firm* — Bryan Peckjian; SKF USA Inc. Patent Dept.

(57) ABSTRACT

A seal assembly seals a first portion of a machine part relative to a second portion of the machine part. The seal assembly includes at least one seal element that contacts the machine part or contacts a component connected with the machine part or that extends with a gap relative to the machine part or to the component connected with the machine part. At least one of the seal element, the machine part and the component connected with the machine part is provided or coated with a material, which has super hydrophobic properties, in the area of the seal element.

11 Claims, 3 Drawing Sheets

(51) Int. Cl.
*F16J 15/447* (2006.01)
*F16J 15/20* (2006.01)
*F16J 15/10* (2006.01)
*F16J 15/08* (2006.01)
*F16J 15/34* (2006.01)

(56) References Cited

U.S. PATENT DOCUMENTS

| | | | | |
|---|---|---|---|---|
| 6,663,110 | B2 * | 12/2003 | Platner | 277/563 |
| 6,976,682 | B1 * | 12/2005 | Macleod et al. | 277/410 |
| 7,914,897 | B2 * | 3/2011 | Zimmermann et al. | 428/447 |
| 2003/0107184 | A1 | 6/2003 | Platner | |
| 2006/0094320 | A1 | 5/2006 | Chen et al. | |
| 2006/0240218 | A1 * | 10/2006 | Parce | 428/98 |
| 2007/0246895 | A1 * | 10/2007 | Pavan | 277/549 |
| 2008/0311337 | A1 * | 12/2008 | Veinot et al. | 428/90 |
| 2009/0107836 | A1 * | 4/2009 | Rash et al. | 204/297.01 |

OTHER PUBLICATIONS

Artus, et al., "Silicone Nanofilaments and Their Applications as Superhydrophobic Coatings", Adv. Mater. 2006, 18, 2758-2762.*

* cited by examiner

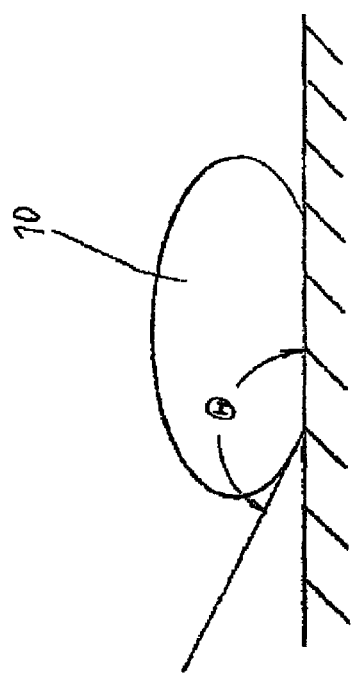
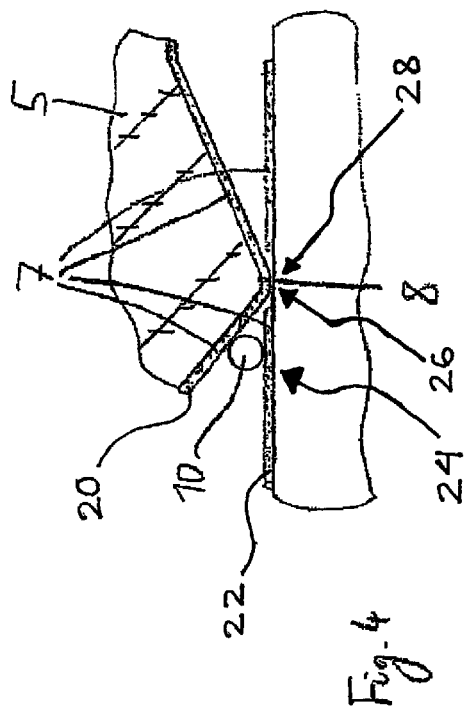

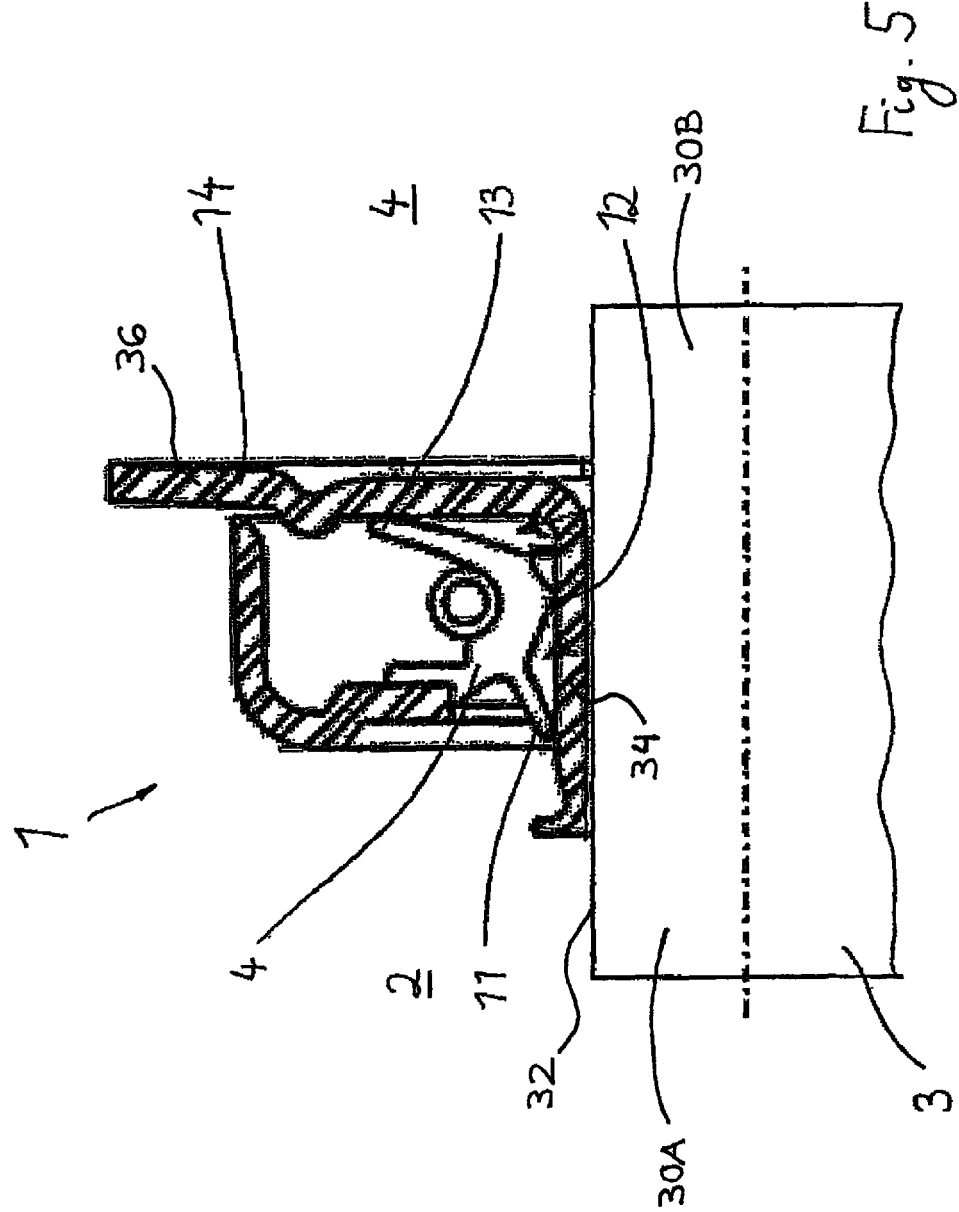

SEAL ASSEMBLY

CROSS-REFERENCE

This application is the U.S. national stage of International Application No. PCT/EP2010/001580 filed on Mar. 12, 2010, which claims priority to German patent application no. 10 2009 013 969.9 filed on Mar. 19, 2009.

TECHNICAL FIELD

The invention relates to a seal assembly that seals a first portion of a machine part relative to a second portion of a machine part, wherein the seal assembly includes at least one seal element that contacts the machine part or contacts a component connected with the machine part or that extends with a gap relative to the machine part or to the component connected with the machine part.

RELATED ART

Seal assemblies of this type are well known. They are used as frictional (e.g., radial shaft seal rings) as well as non-frictional seals (labyrinth seals), by means of which a sealing of an area of a component can be ensured.

Notwithstanding appropriate usage, it can not always be prevented that moisture and dirt enter into the area to be sealed. A corrosion danger and/or a contamination of the lubricant (oil or grease) results due to such an ingress of water, which can lead to operational disruptions and/or even operational breakdowns. Generally speaking, an improved protection against the ingress of moisture can be achieved only by implementing constructive modifications to the seal assembly, e.g., by disposing a greater number of seal elements and/or seal lips.

SUMMARY

Therefore, in one aspect of the present teachings, an improved protection against the penetration of moisture, in particular water, is provided without having to modify the seal design.

In another aspect of the present teachings, a seal element and/or a machine part and/or a component connected with the machine part is provided or coated with a material, which has super hydrophobic properties, in the area of the seal element.

The super hydrophobic material preferably has a water contact angle (.theta.) of at least 150.degree. (for this, see the following embodiments).

The super hydrophobic material includes nano-filaments in an advantageous manner. In particular, the super hydrophobic material can include silicone nano-filaments. Polymethylsilsesquioxane nano-filaments have proven themselves as a preferred material.

According to one embodiment, the seal assembly can comprise at least one seal lip, wherein a portion of at least one seal lip is provided or coated with the material. In particular, it can involve a radial shaft seal. The at least one seal lip can axially or radially contact its counterface. The seal lip can contact a contact disk that is connected with the machine part.

In addition or in the alternative, the seal assembly can comprise a labyrinth seal that includes at least one portion forming a gap, wherein the portion forming the gap is provided or coated, at least partially, with the material. The dimensioning of the gap height is set in accordance with the water contact angle of the material so that the water drop will be larger than the gap height, in order to reliably prevent the ingress of water in such an embodiment.

The machine part interacting with the seal lip or with the labyrinth seal or the component connected with the machine part can be a shaft or a contact ring that can be provided or coated with the material on its surface at least in the area of the seal assembly.

The proposed concept is suitable for seals, which operate with contacting seal elements, as well as for those, which seal in a contact-free manner.

The long-lasting super-hydrophobic effect provides for the formation of spherical-shaped water drops on planar surfaces using the surface tension of the water, which drops can roll off (bead off) in a residue-free manner when inclined. For curved surfaces, such as e.g., in the case of shafts, the water can form ring-shaped structures (torus-shaped structures) when present in sufficient amounts. The sealing effect can be bolstered by an advantageous geometry, so that the to-be-excluded water drops are conveyed in the desired direction.

It is advantageous that the water-repelling property is maintained on the seal and the counterface independent of the surface wear of the contact surfaces, i.e. it is wear-independent.

Exemplary embodiments of the invention are shown in the drawings.

BRIEF DESCRIPTION OF THE DRAWINGS

FIG. 3 shows a water drop lying on a hydrophobic substrate, FIG. 4 shows the detail "Z" of FIG. 1 and FIG. 5 shows the radial cross-section through another seal assembly.

DETAILED DESCRIPTION OF THE INVENTION

Figure 1:
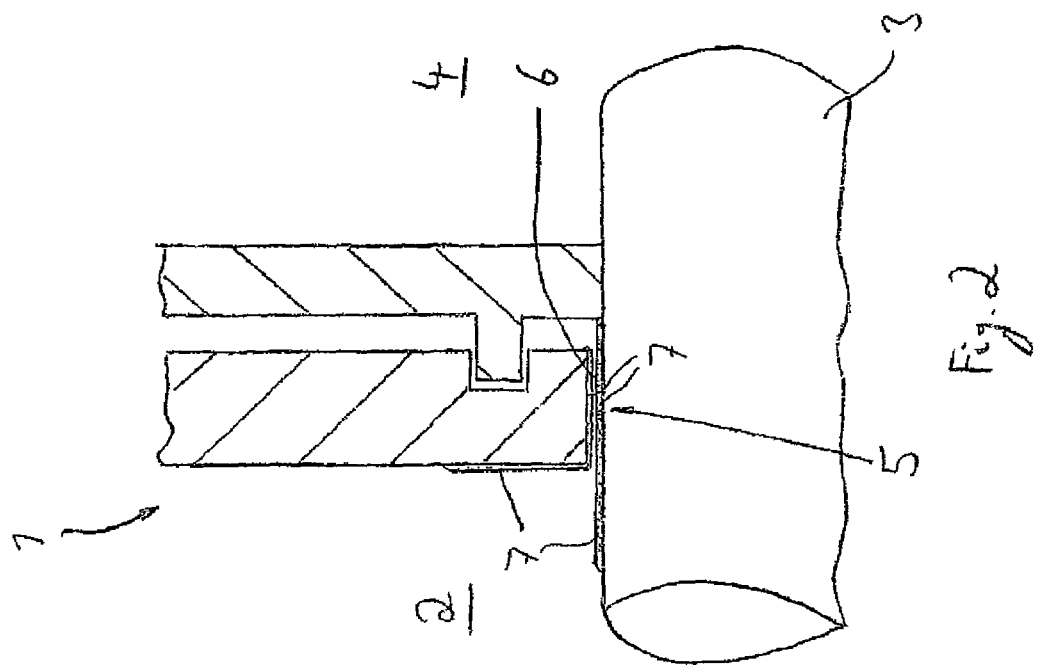
FIG. 1 shows the radial cross-section through a seal assembly in the form of a radial shaft seal.

In FIG. 1, a seal assembly 1 can be seen that seals a first portion (air side) 2 of a machine part 3 in the form of a shaft from a second portion (oil side) 4. For this, the seal assembly 1 includes a seal element 5 that has two seal lips 8 and 9—formed as a radial shaft seal—, which abut on the shaft 3 in a rubbing manner.

Figure 2:
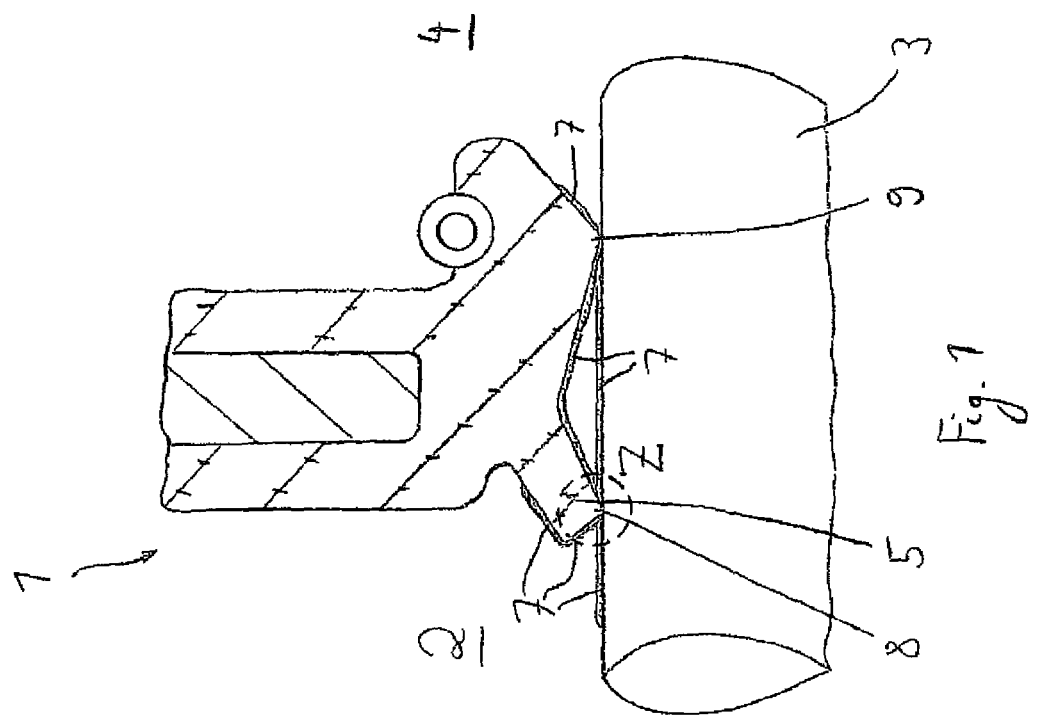
FIG. 2 shows the radial cross-section through a seal assembly in the form of a labyrinth seal.

The same applies to the embodiment according to FIG. 2 in which the seal assembly 1 is embodied as a labyrinth seal, whereby a gap 6 remains between a seal element 5 and the shaft 3, which gap 6 should prevent the penetration of moisture and/or dirt.

In order to improve the protection against the penetration of moisture, in particular water, and also dirt, the invention provides, in both exemplary embodiments, that the seal element 5 as well as the machine part 3 is provided or coated with a material 7 in the area of the seal element 5, which material has super hydrophobic properties. That is, the material is applied to the seal element 5 and/or to the shaft 3 in a rotationally symmetric manner.

The super hydrophobic material has the effect that moisture, and in particular water, is repelled such that water drops form, as is shown according to FIG. 4 for the detail Z of FIG. 1. Here, the ingress of water into the seal assembly 1 can be expected from the left side. A water drop 10 can be recognized here that forms in front of the seal gap due to the super hydrophobic coating 7 and can not pass the seal lip 8. That is, if water contacts the coated surface at such a point, the super hydrophobic effect of the material 7 generates a water drop, or for larger amounts of water a ring-shaped structure, as a consequence of the surface tension of the water. Due to the V-shaped design of the gap, in whose area the drop 10 is located, the water experiences a directional pumping action here away from the seal lip 8. Thus, fluid is encouraged to form into a droplet 10 prior to reaching the seal lip 8 which forms a first contact seal 28 with the rotating shaft. The first contact seal 28 is preferably formed by the at least one seal lip 8 directly abutting an outer surface of the rotatable shaft. The V-shape results in portions of the seal lip and the rotatable shaft being configured in an oblique orientation 24 with an apex 26 formed therebetween and located at the contact seal 28. The markedly-higher hydrophobicity thus prevents the ingress of water into the seal gap and thus it can not be transported into the to-be-sealed space due to the natural conveying capability of the seal edge. The above-mentioned ring-shaped-structured water can also assist the sealing effect, in particular vis-a-vis dust particles. The material 20, 22 located on the portions of the seal lip and the rotatable shaft may be configured in the oblique 24 such that fluid is encouraged to form into a droplet 10 prior to reaching the apex 26 to retard fluid 10 from reaching the first contact seal 28. The material may be disposed partially on either side of the first contact seal 28 on the rotating shaft so as to provide a gap in the material disposed on the rotating shaft located at the first contact seal 28.

An ingress of water into the actual sealed region is prevented by upstream protective elements, such as radially- or axially-disposed seal lips. Even small gaps, which can result from dynamic running deviations, are not surmounted due to the surface tension of the water.

Impregnation of non-woven materials in the protective seal also improves the protection against water and ensures a sufficient ventilation of the main seal element.

For the hydrophobicity of the proposed material 7 proposed according to the invention, the following can be noted: The measure for the degree of the water-repellency (hydrophobe) of materials is the hydrophobicity. Substances that do not mix with water are designated with this and can, in most cases, bead water on surfaces. Non-polar materials, such as greases, waxes, alcohols with long alkyl-residues (i.e. with the exception of methanol, ethanol and propanol), alkanes, alkenes, etc., are hydrophobic. When dissolving some hydrophobic materials, such as methane, in water, disadvantageous clathrate-structures entropically form. Therefore, the solubility of these materials in water is low.

The so-called contact angle .theta. is often utilized to identify the degree of hydrophobicity. The angle is denoted as the contact angle, which a liquid drop (see water drop 10 in FIG. 3) on the surface of a solid forms relative to the surface of the solid. The size of the contact angle .theta. between the liquid and the solid depends on the interaction between the materials at the contact surface. The smaller this interaction is, the larger the contact angle is. In FIG. 3, the contact angle .theta. of a drop 10 lying there is depicted. Thus, in the determination of the contact angle .theta., a drop of the to-be-observed liquid contacts a solid substrate and is surrounded by gas. The contact angle is the angle that is formed by the liquid at the point, at which the solid, liquid and gaseous phases meet.

Certain properties of the surface of a solid—such as for example the surface energy—can be determined from the determination of the contact angle.

In the special case of the use of water as the liquid, the surface is designated as hydrophilic for small contact angles (.theta. is very small), as hydrophobic for angles around 90.degree. and as super hydrophobic for even larger angles (like in FIG. 3). For very large angles (about 160.degree.), the latter is also designated as the Lotus Effect and corresponds to an extremely low wettability. The contact angle can be changed by surface treatment.

Generally speaking, hydrophobic surfaces are comprised of hydrophobic substances or are covered by hydrophobic substances. Examples are the coating of surfaces with PTFE (Teflon) or the impregnation of insulating materials and textiles with hydrophobic materials, such as wax or paraffin.

An extreme example for a hydrophobic surface is the surface of leaves and flowers of the lotus. This surface is rough and also covered with hydrophobic substances. Due to this distinctive attribute, this surface has a contact angle of over 160.degree., so that drops on it are almost round. Water beads up very well on such surfaces. Dirt particles lying thereon are rinsed away very easily. This effect is called the Lotus Effect.

In FIG. 5, another example of a seal assembly 1 is illustrated, in which the inventive design can be provided. The seal element 4 is embodied here as an elastomer part that forms three seal lips 11, 12, 13 in total, which contact a contact ring 14. While the seal lips 11 and 12 radially contact their counterface, the seal lip 13 axially contacts its counterface. The seal lips, which thus act partially axially here, have proven themselves, in particular in severely contaminated and wet environments, such as is found, e.g., in the case of a wheel bearing. The seal assembly preferably includes a rotatable shaft 3 having first and second portions 30A, 30B and an axially extending outer surface 32. A contact ring 14 has an axially extending section 34 and a radially extending section 36. A seal 4, in combination with the contact ring 14, can be configured to seal the first portion 30A of the rotatable shaft 3 relative to the second portion 30B of the rotatable shaft 3. The seal 4 preferably has a radial seal lip 11 and an axial seal lip 13. The axial seal lip 13 forms a first seal with the radially extending section 36 of the contact ring 14 and the radial seal lip 11 forms a second seal with the axially extending section 34 of the contact ring 14.

The invention preferably utilizes nano-filaments to generate the super hydrophobic effect in the material 7. For this, the following can be noted:

To generate a super hydrophobic effect, silicone nano-filaments are preferably utilized according to the invention. These have a diameter of about 5 nm and a length of a few micrometers. They are produced from silanes. Chemically, they are constructed like silicone; however, due to their nano-structure, they possess completely different physical and chemical properties.

The chemical structure of silicone nano-filaments corresponds to that of silicone. Silicon atoms are connected with each other via oxygen atoms. If more than two oxygen atoms serve as the bridge atoms, three-dimensional networks form. The fourth connecting point of the silicon atom is then saturated by an organic residue.

Under certain conditions, no solid silicon-solid-body results on the surfaces during the synthesis, but rather small filaments that are only a few nanometers thick and only a few tens of nanometers long.

In one method, silicon nano-filaments can be produced from the gas phase. For this, trichlorosilane was vaporized in a reaction chamber together with a precisely-set humidity and a substrate is exposed to this mixture for several hours. In this case, it should be noted that the concentration of trichlorosilane and humidity is very precisely set; otherwise a condensation reaction takes place, i.e. it forms the silicone, but no nano-filaments.

Silicone nano-filaments have a variety of, in some cases extreme, properties that can change into the extreme opposite by subsequent chemical modifications. Surfaces thus coated with silicone nano-filaments are extremely water-repellent (super hydrophobic), which is utilized in the present case. Therefore, water drops lie as nearly round balls on the surface; wetting scarcely occurs. This property is described—as was explained—by the contact angle, which is nearly up to 170.degree. in the case of silicone nano-filament coatings. If the surface also rises at even a small angle, e.g., a 2.degree. slope, the beads immediately roll off from the surface.

The proposed design can be utilized on any seal assemblies. This applies, for example, to sealing disks (simple metal covering disks) that are utilized in the axial end portion of a roller- or slide bearing, rotate with one of the bearing rings and frictionally abut on the other bearing ring, thereby maintaining a gap with this bearing ring, i.e. sealing in a friction-free manner. The invention can be utilized with all radial shaft seals that operate with conventional seal lips or those made of PTFE. The idea can also be used in the same manner in protective elements in the form of non-woven materials. This applies in the same manner when radial shaft seal rings are utilized with axially-acting protective lips that utilize separate contact rings.

REFERENCE NUMBER LIST

1 Seal assembly
2 First portion
3 Machine part (shaft, contact disk)
4 Second portion
5 Seal element
6 Gap
7 Material with super hydrophobic properties
8 Seal lip
9 Seal lip
10 Drop
11 Seal lip
12 Seal lip
13 Seal lip
14 Contact ring
20 Coating on portion of the seal lip
22 Coating on portion of the rotatable shaft
24 Oblique orientation
26 Apex
28 First contact seal
30A First portion of rotatable shaft
30B Second portion of rotatable shaft
32 Axially extending outer surface of rotatable shaft
34 Axially extending section of contact ring
36 Radially extending section of contact ring
.THETA. Water contact angle

The invention claimed is:

1. A seal assembly comprising:
a rotatable shaft, and
a radial shaft seal comprising at least one seal lip, the at least one seal lip comprises a body and a coating of a material thereon, the radial shaft seal being configured to directly contact the rotatable shaft so as to create a first contact seal between a first portion of the rotatable shaft and a second portion of the rotatable shaft, the first contact seal being formed by the at least one seal lip directly abutting an outer surface of the rotatable shaft;
the material having super hydrophobic properties, the material is also disposed directly on a portion of the outer surface of the rotatable shaft, the material of the coating of the at least one seal lip being disposed such that the material is positioned between the body of the at least one seal lip and the rotating shaft at the first contact seal,
wherein portions of the seal lip and the rotatable shaft are configured in an oblique orientation with an apex formed therebetween and located at the first contact seal, the material being located on the portions of the seal lip and the rotatable shaft configured in the oblique such that fluid is encouraged to form into a droplet prior to reaching the apex to retard fluid from reaching the first contact seal, and
wherein the material having super hydrophobic properties is disposed partially on either side of the first contact seal on the rotating shaft, providing a gap in the material disposed on the rotating shaft located at the first contact seal.

2. The seal assembly according to claim 1, wherein the outer surface of the rotatable shaft and the at least one seal lip having the material with super hydrophobic properties disposed thereon exhibit a water contact angle ($\theta$) of at least 150°.

3. The seal assembly according to claim 2, wherein the material with super hydrophobic properties comprises nano-filaments.

4. The seal assembly according to claim 3, wherein the material with super hydrophobic properties comprises silicone nano-filaments.

5. The seal assembly according to claim 4, wherein the material with super hydrophobic properties comprises polymethylsilsesquioxane nano-filaments.

6. The seal assembly according to claim 5, wherein the outer surface of the rotatable shaft and the at least one seal lip are coated with the super hydrophobic material and exhibit a water contact angle ($\theta$) of at least 170°.

7. An apparatus comprising:
a machine part,
a seal comprising at least one seal lip, the at least one seal lip comprises a body and a coating of a material thereon, the seal being configured to directly contact the machine part so as to create a first contact seal between a first portion of the machine part and a second portion of the machine part, the first contact seal being formed by the at least one seal lip directly abutting an outer surface of the machine part;
the material having super hydrophobic properties, the material is also disposed directly on a portion of the outer surface of the machine part, the material of the coating of the at least one seal lip being disposed such that the material is positioned between the body of the at least seal lip and the machine part at the first contact seal, and
wherein portions of the seal lip and the machine part are configured in an oblique orientation with an apex formed therebetween and located at the first contact seal, the material being located on the portions of the seal lip and the machine part configured in the oblique such that fluid is encouraged to form into a droplet prior to reaching the apex to retard fluid from reaching the first contact seal, and
wherein the material having super hydrophobic properties is disposed partially on either side of the first contact seal on the rotating shaft, providing a gap in the material disposed on the rotating shaft located at the first contact seal.

8. The apparatus according to claim 7, wherein the material with super hydrophobic properties comprises silicone nanofilaments and each surface having the silicon nano-filaments disposed thereon exhibits a water contact angle (θ) of at least 160°.

9. The apparatus according to claim 8, wherein the material with super hydrophobic properties comprises polymethylsilsesquioxane nano-filaments.

10. The apparatus according to claim 9, wherein the water contact angle (θ) is at least 170°.

11. A seal assembly comprising:
a rotatable shaft and
a radial shaft seal comprising a first seal lip and a second seal lip, the first seal lip and the second seal lip each comprising a body and a material thereon, the radial shaft seal being configured to directly contact the rotatable shaft, such that the first seal lip is configured to contact the rotatable shaft at a first contact seal and the second seal lip being configured to contact the rotatable shaft at a second contact seal axially spaced from the first contact seal,
the material having super hydrophobic properties, the material is also disposed directly on a portion of the outer surface of the rotatable shaft, the material being disposed on the first seal lip and the second seal lip such that the material is positioned between the body of the first seal lip and the rotating shaft at the first contact seal and between the body of the second seal lip and the rotating shaft at the second contact seal,
wherein portions of the first seal lip and the rotatable shaft are configured in a first oblique orientation with a first apex formed therebetween and located at the first contact seal, the material being located on the portions of the first seal lip and the rotatable shaft configured in the first oblique such that fluid is encouraged to form into a droplet prior to reaching the first apex to retard fluid from reaching the first contact seal, and
a recess disposed axially between the first contact seal and the second contact seal, the recess configured to collect fluid in an event that the first seal lip fails to retard fluid, wherein the second seal lip and the rotatable shaft are further configured in a second oblique such that fluid is encouraged to form into a droplet prior to reaching a second apex to retard fluid from reaching the second contact seal,
wherein the material having super hydrophobic properties is disposed partially on either side of both the first contact seal and the second contact seal on the rotating shaft, providing gaps in the material disposed on the rotating shaft one located at the first contact seal and another located at the second contact seal.

* * * * *